United States Patent Office 3,423,052
Patented Jan. 21, 1969

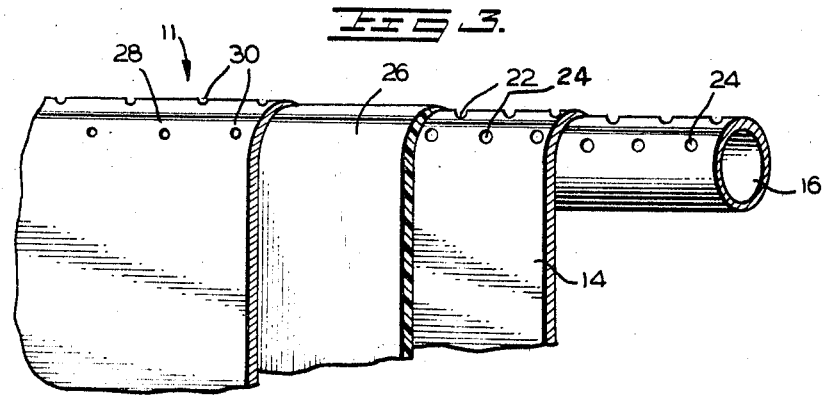
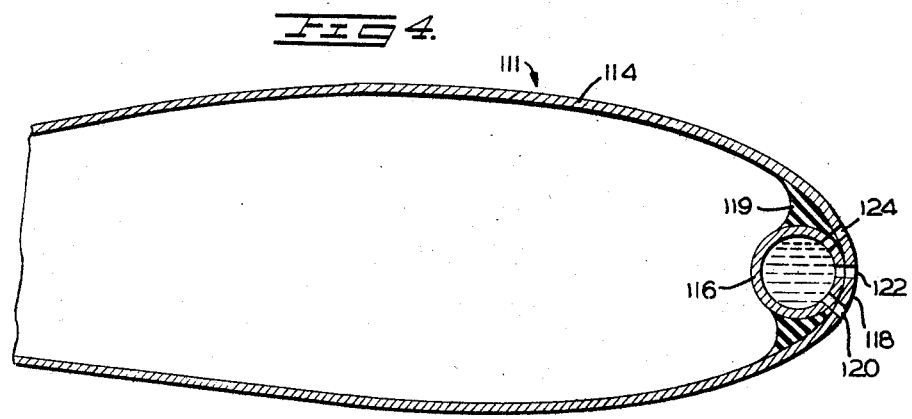
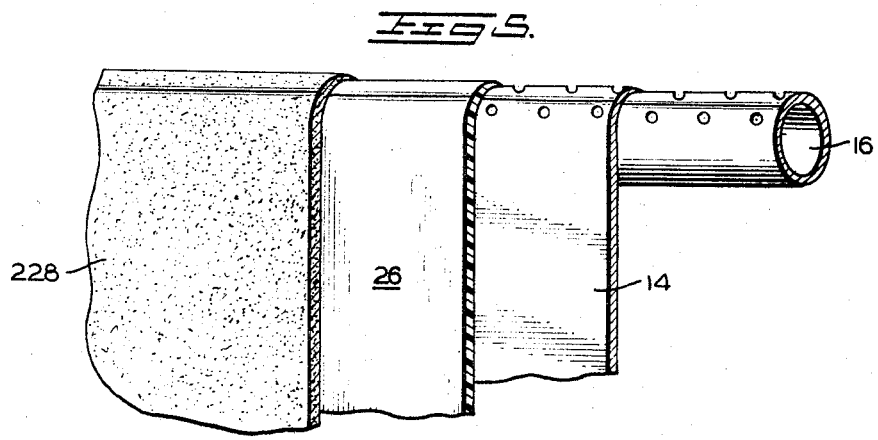

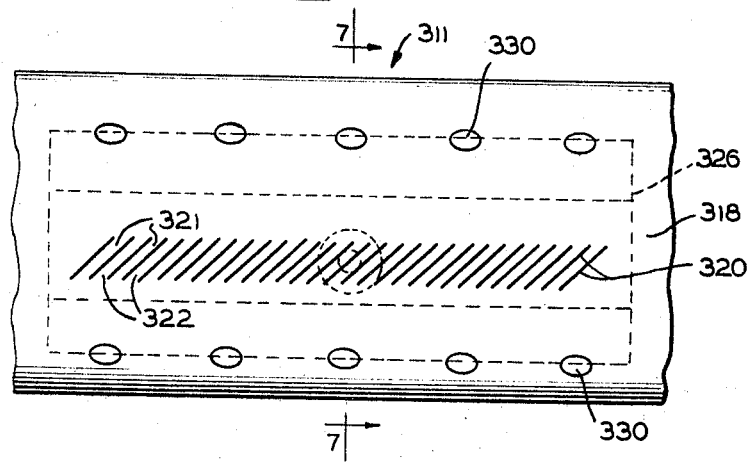
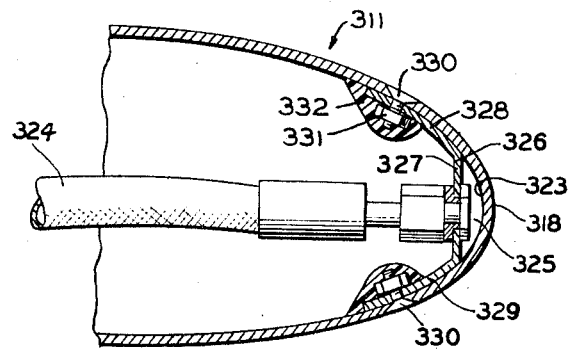

3,423,052
DE-ICING APPARATUS
William P. Lear, Wichita, Kans., assignor to Lear Jet Industries, Inc., a corporation of Delaware
Filed July 21, 1966, Ser. No. 566,958
U.S. Cl. 244—134   8 Claims
Int. Cl. B64d 15/00

ABSTRACT OF THE DISCLOSURE

The apparatus is arranged to distribute de-icing fluid, as along the leading edge of an aircraft wing. A stainless steel layer is secured along the wing, galvanically isolated therefrom. Transverse apertures in this steel layer on the wing, communicate with a fluid distribution conduit contained within the wing, supplying de-icing fluid along the wing when required.

---

This invention relates to de-icing apparatus. More particularly this invention relates to apparatus for de-icing a surface such as an airfoil of an aircraft.

With the advent of successful heavier-than-air aircraft, it was soon discovered that a massing of ice on the surface thereof can become so preponderous as to force the aircraft to the ground. Most aircraft are not able to sustain their own weight and that of any great quantity of ice formed thereon. The mass of ice magnifies the drag characteristics of the aircraft so as to require more power to sustain the minimum required air speed and buoyancy in an atmospheric fluid environment. The problem of ice forming on airfoil surfaces, although weight and drag are critical factors, is over shadowed in powerful, modern high speed aircraft by the additional problem of the ice destroying the airfoil contours that provide lift and stability to the aircraft.

In jet airplanes it is very important that airfoil profiles remain unaltered and/or unencumbered because airfoil dimensions have been greatly reduced in relation to the overall weight of the aircraft. The problem of de-icing airfoil leading edge surfaces has been attacked in many different and varied ways. For example, a rubber de-icing boot that has been made conventional on relatively slow piston driven airplane wings is no longer acceptable. The reasons for this is that the exterior of the leading edge of an airfoil of a jet airplane must be made of a heat and erosion resistant material adequate to maintain its own integrity and the integrity of the airfoil leading edge configuration. Moreover, a cumbersome, expensive, and complicated de-icing apparatus, that is difficult to install or backfit is not acceptable. This is particularly true in a jet airplane that must be competitive pricewise with piston-powered airplanes of the same class.

It is therefore an object of this invention to provide novel means for de-icing a surface of an aircraft and more particularly for de-icing the leading edge of an aircraft airfoil, wherein the novelty feature and utility thereof resides in the inherent simplicity of construction, installation, and operation of the de-icing means.

Another object of this invention is the provision of a novel easy-to-operate de-icing apparatus that is economical to manufacture and install in an aircraft especially during the manufacture thereof, and which can also be readily installed or backfitted on existing aircraft without causing major modification of the aircraft or of the airfoils thereof on which the apparatus is being installed.

Yet another object of this invention is the provision of a novel apparatus for de-icing a leading edge of a wing on a jet aircraft that is lightweight in construction, easy to install, heat resistant, and as rugged in its construction as the rest of the wing.

Another object of this invention is the provision of novel means for de-icing a surface of a material comprising, means for metering or bleeding de-icing fluid through openings in the surface of the material, uniformly dispersing the fluid over the exterior surface of the material through a plurality of openings formed in the material from a fluid dispersing chamber behind the material, the fluid having a low freezing point and being resistant to evaporation, functioning to interpose itself between the outer surface of the material and ice contiguous therewith for freeing the ice from the heat resistant material.

A still further object of this invention is the provision of novel de-icing means, as set forth in the preceding object, wherein the plurality of openings comprise a plurality of slits formed in the material of a length and width adjusted to meter or bleed the fluid through the material in predetermined quantities.

Yet another object of this invention is the provision of novel means for de-icing the leading edges of the wings of an aircraft, comprising, the provision of openings such as slits in the leading edge of the wings, preferably of a metal alloy, and along an aerodynamic stagnation line thereof for metering or bleeding de-icing fluid therethrough to the outer surface of the wings, the slits being parallel in each wing and slanted downwardly and outwardly from the root to the tip of each wing.

A still further object of this invention is the provision of novel means for de-icing a surface of a skin material comprising, means for ejecting a de-icing fluid through openings in the surface of the material, uniformly dispersing the fluid over the exterior surface of the skin material by the use of a fluid absorbent material disposed thereon, and then further forcing the fluid through a large number of small openings formed in a layer of heat resistant material disposed over and coextensive with the absorbent material, the fluid having a low freezing point and being resistant to evaporation, functioning to interpose itself between the outer surface of the heat resistant material and ice contiguous therewith for freeing the ice from the heat resistant material.

Yet another object of this invention is the provision of a novel airfoil leading edge having a skin formed of a suitable metal alloy, the superposition of a de-icing fluid absorbable material over the leading edge of the airfoil and extending rearwardly over the chord of the airfoil to the thickest portion thereof and then being feathered rearwardly in order to provide a smooth streamlined surface superimposing and substantially encasing the absorbable material with a stainless steel skin of preferably from .020 to .040 inch thickness that is provided with a large number of uniformly arranged openings preferably of a size of approximately one micron to .015 inch, securing a tube inside and contiguous with the airfoil leading edge for conducting a de-icing liquid therethrough, and providing the airfoil skin along the stagnation line or zone thereof with a plurality of uniformly spaced openings coextensive with openings in the tube and communicating with the absorbable material so that de-icing fluid can be pumped from the tube into the holes in the airfoil leading edge, dispersed into the absorbent material and through the smaller openings in the stainless steel skin and interposing itself between the outer surface of the stainless steel skin and any ice formed thereon for causing the ice to be freed for separation to the atmosphere.

The invention further resides in certain novel features of construction, combinations and arrangements of parts, and further objects and advantages of the invention will be apparent to those skilled in the art to which it pertains from the following description of the present preferred embodiments thereof described with reference to the accompanying drawings, which form a part of this specification, and wherein the same reference characters represent corresponding parts throughout the several views, and in which:

FIG. 3 is an enlarged partial plan view of a leading edge of the wing with various parts broken away in such a manner as to show additional details of the construction of the wing;

FIG. 4 is a view similar to FIG. 2, but of an alternate embodiment of the apparatus of the invention;

FIG. 5 is a view similar to FIG. 3, but of a third embodiment of the invention;

FIG. 6 is a fragmentary front elevational view of a section of an airfoil leading edge embodying another modification of the invention; and FIG. 7 is a cross-sectional view along line 7—7 of FIG. 6.

Figure 1:
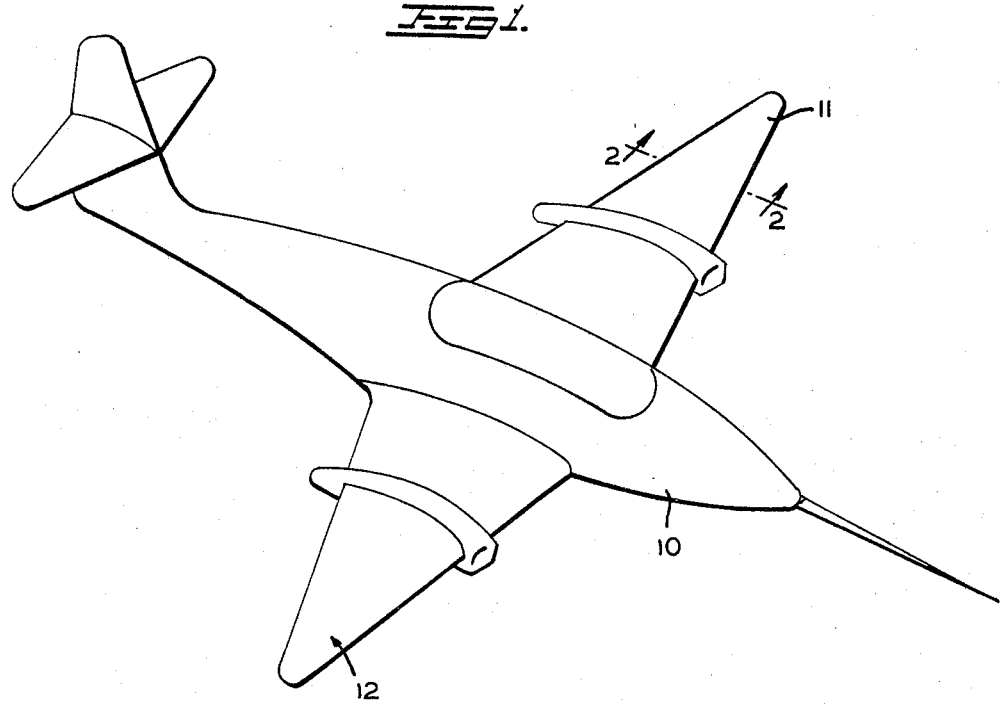
FIG. 1 is a pictorial view of an aircraft embodying the invention.

It is to be understood that the invention is not limited to the details of construction and arrangement of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

FIG. 1 shows a modern jet airplane 10 having two wings indicated generally by the reference numerals 11 and 12. A de-icing apparatus, indicated generally by reference numeral 13 embodying the invention, is installed in a leading edge of each of the wings 11 and 12, FIG. 2. The airplane 10 is shown for purposes of describing the best mode for carrying out this invention. But it is to be understood that this invention is not restricted to that of a wing of an aircraft, but can be applied to other airfoils, vehicles, apparatuses, and articles of manufacture.

Figure 2:
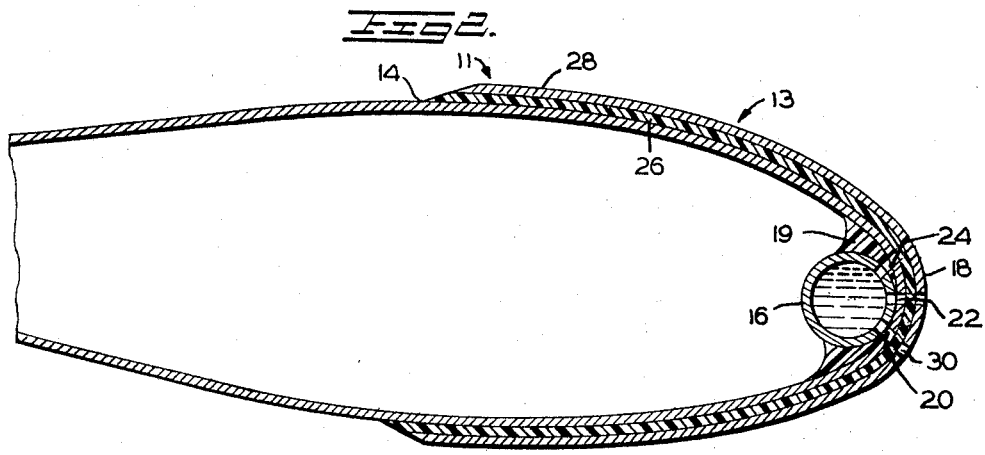
FIG. 2 is an enlarged cross-sectional view of a wing taken along line 2—2 of FIG. 1 showing details of one embodiment of the invention.

The airfoil surface of the wing 11 is defined by a skin 14, FIG. 2. The skin 14, by way of example, has a thickness of approximately 0.40 inch and is preferably of an aluminum alloy. The internal support structure of the wing 10 is not shown for purposes of clarity.

A tubular conduit 16 is disposed coextensive with and contiguous to the internal surface of the skin 14 at a leading edge 18 of the wing 11. The conduit 16 is bonded to the wing 11 preferably by a fully cured polyepoxide resin adhesive 19. The conduit 16, the airfoil leading edge 18, and the epoxy adhesive 19 are provided with three rows of cylindrical openings 20, 22, and 24. These openings are preferably of approximately 1/16 of an inch in diameter and are for the purpose of conducting a de-icing fluid from a reservoir, not shown, through the conduit 16 to the surface of the leading edge 18 of the wing 11. It is to be understood that the openings 20, 22, and 24 need not be of any particular cross-sectional configuration so long as they perform the function of conducting fluid under pressure from a pump, not shown, through the tube 16 to the exterior of the wing 11. However, preferably the openings 20, 22, and 24 are arranged in equally spaced apart relationship for the efficient distribution of the fluid ejected therethrough under hydraulic pressure.

The tube 16 is preferably cylindrical. However, the tube 16, if desired, may be of a flattened or oval cross-sectional configuration to conform to the inside contour of the skin 14 at the leading edge 18 of the wing 11. The conduits 20, 22, and 24, shown formed in FIG. 2 in the epoxy resin adhesive 19, are preferably of minimum size or altogether eliminated by properly shaping the cross-sectional configuration of the tube 16.

It is to be understood that the tube 16 can be of any particular material suitable for carrying out the function of conducting de-icing fluid. It is also to be understood that the adhesive 19 need not be of the preferred epoxy resin, but suitable conventional means may be used for securing the tube 16 in place behind the leading edge 18 of the wing 11.

A fluid absorbable polymeric material 26 is interposed between the outer surface of the airfoil 11 and a perforated stainless steel sheathing 28. The absorbable material 26 is of a synthetic porous construction for the efficient absorption and distribution of the de-icing fluid. Preferably the de-icing fluid is a mixture of a minor quantity of isopropanol with ethylene glycol. The isopropanol is used as a thinner and to reduce the freezing point of the mixture to below minus sixty-five degrees (−65° C.) centigrade, if desired. However, it is to be understood that any other de-icing fluid of a freezing temperature of approximately minus thirty degrees (−30° C.) centigrade may be used. It is also to be understood that the de-icing fluid may be an aerosol or a foam, such as a mixture of de-icing liquid and air. Although this de-icing liquid must be capable of being rapidly and efficiently dispersed, it must be of such a viscosity and volatility that it does not easily evaporate in its intended environment.

The ability of the absorbent material 26 to maintain suitable back-pressure in the conduit 16 is important. Yet the mateial 26 must meter the de-icing fluid therethrough at the required rate. A preferred material is a polytetrafluoroethylene treated fiberglas material that is thin and porous. Polytetrafluoroethylene is called Teflon.[1] Porous polyvinylchloride is also considered suitable for this application.

Preferably the sheathing 28 encasing the absorbent material 26 is perforated stainless steel of approximately .020 to .040 inch thickness. The sheathing 28 has perforations comprising uniformly spaced cylindrical openings 30 extending therethrough preferably of approximately .010 inch diameter or less. As stated, the function of the openings 30 is to disperse the de-icing fluid so that the migratory characteristic of the fluid operates to intersperse the fluid between the outer surface of the stainless steel sheathing 28 and any ice coating the stainless steel sheathing 28.

Preferably the stainless steel sheathing 28 and the absorbent material 26 are secured to the outer surface of the wing skin 14 by means of a cured polyepoxide resin adhesive. The adhesive can be of any other desired materials, but must be of lightweight and have sufficient adhering strength and durability to hold the stainless steel sheathing 28 and the absorbent material 26 onto the leading edge 18 of the wing 11. The wings 11 and 12 of the jet airplane 10 are "wet" wings that also function as fuel tanks. Accordingly, the adhesives used must be resistant to jet fuel.

Preferably the sheathing 28 and the absorbable material 26 extend from the leading edge 18 of the wing 11, both above and below the wing 11, beyond the thickest chord section or the maximum camber of the wing 10 where the ice had a tendency to impact, melt and freeze in place in the greatest quantity. It is on the leading edge of the wing 11 where the stainless steel sheathing 28 is placed that the ice has the greatest tendency to accumulate. As pointed out, this massing of ice has the effect of destroying the airfoil contour and therefore impairing the vital lift characteristic of the wing. Also ice may accumulate to the point of seriously reducing the ability of the aircraft to sustain itself in flight.

It is to be understood that the dimensions and the pattern of the openings 20, 22, 24 in the wing leading edge 18 and the openings 30 in the sheathing 28 as described herein are not to restrict the scope of this invention.

It is to be emphasized that the de-icing apparatus 13 of this invention need not be interrupted at any point along the leading edge of the wing due to any inherent

---

[1] Trademark of E. I. du Pont de Nemours Inc., of Wilmington, Del.

limitations of this invention. It is preferred that the de-icing apparatus 13 extend from the root to the tip of the airfoil. It is also to be understood that the de-icing apparatus 13 of this invention need not be restricted to the leading edge 18 of the wing 11 since it can be applied to any exposed surface of a vehicle whether it be an airplane, a rocket or a ground vehicle.

The advantages of this invention are that it is lightweight, easy to install, and can be operated either automatically or manually by an observer who has noted any undesirable accumulation of ice over the de-icing apparatus. The operation of this de-icing apparatus need not be continuous but may be intermittent as required and the fluid may be either mechanically or manually pumped as required. Due to the fact that the apparatus 13 is operated only as a need may arise and since jet flights are of only short duration, only a small quantity of fluid need be provided for and stored in the aircraft. For example, some jet airplanes have an in-flight operational time of only forty-five minutes. There is therefore no need for storing a large quantity of de-icing fluid. Accordingly, it is apparent that ice formation will be encountered only at irregular intervals and not for any great length of time. This permits the storage of a supply of only a few gallons of de-icing fluid.

Another advantageous feature of this invention is that the installation of this apparatus may be interrupted at any point along the wing 11 by simply eliminating the holes or openings 20, 22, 24, and 30, the absorbent material 26, and stainless steel sheathing 28. The conduit 18 can be formed around any engines, internal structure, or equipment without any great loss of efficiency or great increase in weight.

A second embodiment of the invention is shown in FIG. 4. The invention can be greatly simplified by omitting the polymeric material 26 and the stainless steel sheathing 28. This also eliminates any danger of galvanic action between the stainless steel sheathing 28 and the aluminum alloy skin 14. The polymeric material 26 and the epoxy adhesive effectively galvanically isolate the aluminum from the stainless steel.

FIG. 4 shows a wing 11 having a skin 114, preferably of an aluminum alloy. A de-icing fluid conduit 116 extends from a root to a tip of the wing 111. The conduit 116 is secured against an inner surface of the skin 114 behind a leading edge 118 thereof by a cured polyepoxide resin adhesive 119. Cylindrical openings 120, 122 and 124 radially extend from the conduit 116 through the adhesive 119 and the skin 114 at the leading edge 118 of the wing 111 to the exterior thereof. The openings 120, 122, and 124 are of such dimension, number and arrangement as to effectively meter the de-icing fluid to the wing exterior as desired following an undesirable accumulation of ice on the wing leading edge 118. The embodiment of FIG. 4 is particularly ideal for small aircraft where a low cost de-icing installation is merited.

Each opening 122 is located at the stagnation point of the airfoil and coplanar with the chord of the airfoil. The openings 120, 122, and 124 are evenly spaced along the leading edge 118 of the wing 111. The openings 120 and 124 are arranged below and above the openings 122, respectively. However, the spacing of the openings 120, 122 and 124 may be staggered as desired.

A third preferred embodiment of the invention is shown in FIG. 5. This embodiment is similar to that of FIGS. 1 and 2 except that the stainless steel sheathing 228 is of porous construction and thus the openings 30 of FIG. 3 are no longer needed. The pores may vary in size from one micron to .015 inch as desired.

Another preferred embodiment of the invention is shown in FIGS. 6 and 7. The reference numeral 311 indicates generally an airfoil, such as a wing.

The embodiment of FIGS. 6 and 7 is similar to that of FIG. 4 except that the metal skin of a leading edge 318 of the wing 311 has a plurality of parallel slits 320 formed along and traversing the line of aerodynamic stagnation. The slits 320 are preferably slanted downwardly and outwardly along the leading edge 318 of the wing 311 from the root to the tip thereof in such a manner that de-icing fluid seeping therefrom is substantially evenly or uniformly distributed over the wing leading edge 318 by the aerodynamic slip stream. The slits 320 are preferably slanted at an angle of forty-five degrees to the stagnation line. In this embodiment, for example, the slits 320 are approximately one-half inch (0.500 in.) long and are spaced approximately one-eighth inch (0.125 in.) apart.

It is to be understood that the slits 320 may extend only a short distance along the wing leading edge 318, along the entire wing leading edge 318, and/or discontinued as desired thereon. Moreover, the invention may be embodied in any vehicle airfoil, either rotary, movable, or fixed.

The slits 320 are preferably formed by shearing adjacent slits 320 with a punch and die in such a manner that alternate ribbons 321 of wing skin metal are depressed and curved inwardly in a concave configuration. The wing leading edge 318 as a result has alternate concave ribbons 321 and convex ribbons 322, each of one-half inch length in this example.

A backside and inside or interior 323 of the skin forming wing leading edge 318 is then shot peened until the alternate concave strips 321 are hammered into a convex configuration substantially coplanar or even with the convex ribbons 322 or until the slits 320 are adjusted to allow the metering, bleeding, or seepage therethrough of the de-icing fluid at the desired rate or in the desired amount.

As best seen in FIG. 7, de-icing fluid is fed through a conduit such as a flexible hose 324 into a de-icing fluid distribution conduit or chamber 325. The chamber 325 is formed by the backside 323 of the skin at the airfoil leading edge 318 and a sheet 326 of liquid impervious material, such as a metal alloy. The sheet 326 is of substantially rectangular configuration of generally U-shaped cross-section. The sheet 326 has a web 327 and rearwardly extending legs or flanges 328 and 329 biased against and conforming to the contour of the inner surface or backside 323 of the airfoil leading edge 318 by means of conventional fasteners, such as bolts 330 and nuts 331. More particularly, the bolts 330 function as rivets and have countersunk flat heads flush with the outer surface of the airfoil skin. The nuts 331 are threaded onto the bolts 330. A suitable sealant such as a cured organic adhesive 332 effectively seals the peripheral edges and ends of the backing sheet 326 and the fasteners 330 and 331 against de-icing fluid leakage. The backing sheet 326 is preferably effectively galvanically isolated from the airfoil skin, unless the backing sheet 326 is galvanically matched with or is of the same material as the airfoil skin.

The fluid pressure in the hose 324 and the chamber 325 is adjusted according to the size and number of the slits 320, to regulate the quantity and rate at which the de-icing fluid is metered through the slits 320.

If desired, the slits 320 along the wing leading edge stagnation line may be formed in a separate narrow strip of metal. The slits 320 may be described as macroscopic cracks that may have a tendency to migrate due to metal fatigue and/or any high stress concentration at the ends of the cracks. The narrow strip would limit crack migration, since the cracks or slits 320 could not migrate beyond the boundaries of the strip.

Alternatively, stress may be relieved by other conventional means, such as by forming rounded fillets or drill holes at the ends of the cracks or slits 320.

What is claimed is:

1. Apparatus for distributing de-icing fluid comprising a first wall of aluminum alloy, a second wall disposed over said first wall, said second wall being of stainless steel containing transverse apertures permitting passage of the de-icing fluid therethrough, said first wall being coextensive with said second wall, de-icing fluid distribution means disposed between said first and second walls and substantially coextensive with said second wall for absorbing and distributing the de-icing fluid, said de-icing fluid distribution means galvanically isolating said aluminum alloy from said stainless steel walls, first adhesive means securing said second wall and said de-icing fluid distribution means to said first wall, de-icing fluid conduit and distribution means connected to said first wall on a side thereof opposite to said second wall, second adhesive means securing said de-icing fluid conduit and distribution means to said first wall, means forming a plurality of conduits through said first wall and said second adhesive means and the wall of said fluid conduit and distribution means, and means for supplying the de-icing fluid under pressure to said second wall through said conduit means.

2. Apparatus as set forth in claim 1, wherein said first wall is an airfoil skin and said stainless steel wall is arranged externally thereon along its leading edge.

3. Apparatus as set forth in claim 1, wherein said stainless steel second wall is of porous configuration for said liquid passage therethrough.

4. Apparatus as set forth in claim 1, wherein said first and second adhesive means are cured polyepoxide resin.

5. Apparatus as set forth in claim 1, wherein said de-icing fluid distribution means is a fluid absorbent porous polymeric material of a thickness and porosity selected to control the flow of the de-icing fluid at the desired rate.

6. Apparatus as set forth in claim 5, wherein said porous polymeric material is selected from a group consisting of polyvinylchloride and polytetrafluoroethylene treated glass cloth.

7. Apparatus for distributing de-icing liquid comprising, first wall means of liquid impervious material, second wall means disposed over said first wall means for permitting the passage of the de-icing liquid therethrough, de-icing liquid distribution means of polymeric porous material disposed between said first and second wall means and substantially coextensive with said second wall means for absorbing and distributing the de-icing liquid, first polyepoxide resin adhesive means securing said second means and said de-icing liquid distribution means to said first wall means, de-icing liquid conduit and distribution means disposed in juxtaposition with said first wall means on a side thereof opposite to said second wall means, second polyepoxide adhesive means securing said de-icing liquid conduit and distribution means to said first wall means, means forming a plurality of conduits through said first wall means and and second polyepoxide adhesive means and radially through the wall of said liquid conduit and distribution means, and means for supplying the de-icing liquid under pressure to said second wall means through said conduit means.

8. Apparauts for distributing de-icing liquid comprising, first wall means of an aluminum alloy, second wall means of porous stainless steel disposed over said first wall means for permitting the passage of the de-icing liquid therethrough, de-icing liquid distribution means of porous polymeric material disposed between said first and second wall means and substantially coextensive with said second wall means for absorbing and distributing the de-icing liquid galvanically isolating the stainless steel from the aluminum alloy, first cured polymeric adhesive means securing said second means and said de-icing liquid distribution means to said first wall means, de-icing liquid conduit and distribution means connected to said first wall means in a side thereof opposite to said second wall means, second cured polymeric adhesive means securing said de-icing liquid conduit and distribution means to said first wall means, means forming a plurality of conduits through said first wall means and said second cured polymeric adhesive means and the wall of said liquid conduit and distribution means for being dispersed thereby to said second wall means and through the pores to the outer surface thereof.

References Cited

UNITED STATES PATENTS

| | | | |
|---|---|---|---|
| 2,075,659 | 3/1937 | Ramsbottom et al. | 244—134 |
| 2,097,926 | 11/1937 | Kimball | 244—134 |
| 2,155,964 | 4/1939 | Bowers et al. | 210—171 |
| 2,576,487 | 11/1951 | Stanley | 244—134 |
| 2,876,970 | 3/1959 | Halbert | 244—134 |

MILTON BUCHLER, *Primary Examiner.*

J. PITTENGER, *Assistant Examiner.*